United States Patent [19]

Hartman et al.

[11] Patent Number: 4,678,036
[45] Date of Patent: Jul. 7, 1987

[54] MISCIBLE OIL RECOVERY PROCESS

[75] Inventors: Kathy J. Hartman, Arlington; Winston R. Shu, Dallas, both of Tex.

[73] Assignee: Mobil Oil Corporation, New York, N.Y.

[21] Appl. No.: 704,232

[22] Filed: Feb. 22, 1985

[51] Int. Cl.$^4$ .............................. E21B 43/22
[52] U.S. Cl. ..................... 166/273; 166/274
[58] Field of Search ............... 166/272, 273, 252, 274, 166/285

[56] References Cited

U.S. PATENT DOCUMENTS

| | | | |
|---|---|---|---|
| 2,623,596 | 12/1952 | Whorton et al. | 166/274 |
| 2,875,832 | 3/1959 | Martin et al. | 166/275 |
| 3,249,157 | 5/1966 | Brigham et al. | 166/273 |
| 3,262,498 | 7/1966 | Connally, Jr. et al. | 166/273 |
| 3,497,007 | 2/1970 | Williams et al. | 166/273 |
| 3,620,304 | 11/1971 | Hearn et al. | 166/274 |
| 3,623,552 | 11/1971 | Vairogs | 166/274 |
| 3,661,208 | 5/1972 | Scott et al. | 166/274 |
| 3,687,198 | 8/1972 | Hearn et al. | 166/274 |
| 3,811,503 | 5/1974 | Burnett et al. | 166/252 |
| 3,823,774 | 7/1974 | Chiu | 166/252 |
| 3,871,451 | 3/1975 | Brown | 166/267 |
| 3,878,892 | 4/1975 | Allen et al. | 166/267 |
| 3,892,668 | 7/1975 | Chiu | 252/8.55 D |
| 4,136,738 | 1/1979 | Haynes, Jr. et al. | 166/273 |
| 4,299,286 | 11/1981 | Alston | 166/274 |
| 4,372,381 | 2/1983 | McMillen | 166/274 |
| 4,605,066 | 8/1986 | Djabbarah | 166/273 |

*Primary Examiner*—Stephen J. Novosad
*Assistant Examiner*—William P. Neuder
*Attorney, Agent, or Firm*—Alexander J. McKillop; Michael G. Gilman; Charles A. Malone

[57] ABSTRACT

A miscible flooding process for oil recovery employs a multiple contact miscible solvent such as carbon dioxide and an additive such as butane which lowers the minimum miscibility pressure of the oil/solvent system. The additive is injected in a slug with a solvent, preferably followed by a slug of water to improve sweep, after which solvent alone may be injected to extract residual additive and oil by miscible extraction. A number of slugs of solvent, either by itself or with the additive may be injected, with intervening slugs of water and finally, water injection may be made to termination.

30 Claims, No Drawings

MISCIBLE OIL RECOVERY PROCESS

FIELD OF THE INVENTION

This invention relates to the recovery of oil from subterranean, oil-bearing reservoirs using a miscible displacement fluid such as carbon dioxide.

BACKGROUND OF THE INVENTION

In the recovery of oil from subterranean, oil-bearing formations or reservoirs, it is usually possible to recover only a limited proportion of the original oil present in the reservoir by the so-called primary recovery methods which utilize the natural formation pressure to produce the oil through suitable production wells. For this reason, a variety of supplementary recovery techniques have been employed, directed either to maintaining formation pressure or to improving the displacement of the oil from the porous rock matrix. Techniques of this kind have included formation pressurization, thermal recovery methods such as steam flooding and in situ combustion, water flooding and miscible flooding techniques.

In miscible flooding operations, a solvent is injected into the reservoir to form a single phase solution with the oil in place so that the oil can then be removed as a more highly mobile phase from the reservoir. This provides extremely effective displacement of the oil in the areas through which the solvent flows, so that an extremely low residual saturation is obtained. The efficiency of this process derives from the fact that under the conditions of temperature and pressure prevailing in the reservoir, a two-phase system within the reservoir between the solvent and the reservoir oil is eliminated. When this happens the retentive forces of capillarity and interfacial tension which are significant factors in reducing the recovery efficiency of oil in conventional flooding operations where the displacing agent and the reservoir oil exist as two separate phases, are eliminated or substantially reduced.

Miscible recovery operations are normally carried out by a displacement procedure in which the solvent is injected into the reservoir through an injection well to displace the oil from the reservoir towards a production well from which the oil is produced. Because the solvent, typically a light hydrocarbon such as liquid petroleum gas (LPG) or a paraffin in the $C_2$ to $C_6$ range, may be quite expensive, it is often desirable to carry out the recovery by injecting a slug of the solvent, followed by a cheaper displacement liquid such as water. However, the economics of miscible recovery operations using first contact miscible solvents such as LPG or light hydrocarbons are quite unattractive.

Of the various miscible recovery processes so far used or proposed, flooding by carbon dioxide is considered to be of substantial promise. In the carbon dioxide flooding technique, a slug of carbon dioxide is injected into the formation to mobilize the oil and permit it to be displaced towards a production well. Carbon dioxide is considered a miscible-type flooding agent because under supercritical conditions, usually high pressure, carbon dioxide acts as a solvent and in certain reservoir situations, has a great advantage over more common fluids as a displacement agent. Even under conditions where the carbon dioxide is not wholly effective as a solvent for the oil, recovery may be improved by taking advantage of the solubility of carbon dioxide in the oil, causing a viscosity reduction and a swelling of the oil, which leads to increased recovery. These effects have been utilized at pressures much lower than the miscibility pressures for carbon dioxide and oil. Processes using carbon dioxide as a recovery agent are described in U.S. Pat. Nos. 3,811,501, 3,811,502, 3,497,007, 4,299,286 and 4,410,043.

Carbon dioxide is not a first contact miscible solvent like LPG or a light hydrocarbon, which forms a single phase solution with the reservoir when the two come into contact, i.e. upon their first contact. Rather, carbon dioxide is a multiple contact miscible solvent which forms a single phase only after a period of time during which the carbon dioxide first preferentially extracts the light hydrocarbons containing from two to six carbon atoms from the crude oil, thereby developing a hydrocarbon-containing solution at the interface between the carbon dioxide and the crude oil. This solution is able to dissolve other, heavier hydrocarbons, i.e. $C_{6+}$ hydrocarbons and these progressively enter the solution to form the desired single phase which is then carried forward through the reservoir, progressively dissolving heavier hydrocarbons as it advances. Thus, as the flooding front advances through the reservoir, the composition of the displaced fluid gradually changes from the crude oil to that of the pure carbon dioxide.

Multiple contact miscibility is a function of the pressure of the system and the minimum pressure required to achieve multiple contact miscibility is called the minimum miscibility pressure or MMP. This varies according to the nature of the oil and of the solvent and in accordance with certain other factors. In some reservoirs, the minimum miscibility pressure may be unattainable due to factors such as low overburden pressure or the impracticality of pressurizing the reservoir. If the minimum miscibility pressure cannot be achieved in the reservoir, the flooding process will be immiscible in character and recovery from the solvent injection will be low.

The minimum miscibility pressure of carbon dioxide and other solvents may be decreased by the use of additives such as various low molecular weight hydrocarbons, e.g. $C_2$ to $C_6$ paraffins and the use of these additives may permit miscible flooding to be carried out in reservoirs which do not permit the minimum miscibility pressure to be attained. A recovery process using carbon dioxide as a solvent together with a $C_2$ to $C_6$ hydrocarbon is described in co-pending application Ser. No. 593,465 filed Mar. 26, 1984 by N. F. Djabbarah, commonly owned with the present application. Although the use of a solubility additive of this kind is undoubtedly favorable, it does have the disadvantage of making the process less economically attractive since the additives are not completely recovered from the reservoir and to this extent, there cost must be considered in the economics of the process. It would therefore be desirable to minimize the amount of the solubility additive which needs to be used.

SUMMARY OF THE INVENTION

It has now been found that the amount of the solubility improving additive which is required may be reduced as the flooding operation progresses. The solvent which is initially injected into the formation contains a relatively high amount of the solubility additive but this is progressively reduced, either continuously or stepwise, as the flooding operation proceeds and more solvent is injected. Because the solubility additive is soluble in the oil, it will remain in the reservoir together with residual oil which is not displaced by the initial portions of the solvent and it will then act to improve the solubility of the residual oil in the further portions of solvent which are injected with a lower proportion of the additive. The final portions of the solvent may be injected without any additional additive.

The mixture of solvent and additive is preferentially injected in slugs with intervening water slugs to improve the sweep of the process. Finally, the bank of solvent may be driven through the reservoir by continuous water injection until the process can no longer be economically operated.

The process is particularly suitable with carbon dioxide as the solvent but it may also be used with other solvents, especially multiple contact miscible solvents such as methane and nitrogen at high pressures. With carbon dioxide, the preferred solubility additives are light hydrocarbons such as LPG and other $C_2$ to $C_6$ paraffins.

DETAILED DESCRIPTION

The oil is recovered from the subterranean, oil-bearing formation or reservoir by injecting a solvent into the reservoir through an injection well and recovering fluids from a production well which is at a horizontal distance or offset from the injection well. In practice, more than one injection well and more than one production well may be used and these may be arranged in a number of different patterns suitable for solvent drive operations of this kind. For example, the wells may be arranged for a line drive with the injection wells arranged in a line and the production wells in lines parallel to the injection wells or in a pattern such as five spot, inverted five spot, seven spot, inverted seven spot or other conventional arrangements. For simplicity, however, the present invention is described below with reference only to a single injection well and a single production well.

The solvent which is used is, for economic reasons, preferably one which is miscible with the oil upon multiple contact and of these solvents, carbon dioxide is preferred because it is cheap, readily available and interacts favorably with the oil, not only by the formation of a more mobile solution phase but also, because it also tends to swell the oil and reduce its viscosity even under conditions which are not conducive to the formation of a solution. Thus, even if a solution is not formed because of unfavorable reservoir conditions, the carbon dioxide may penetrate into the oil and form a more mobile phase which can then be displaced either ahead of the solvent bank or, alternatively, which may migrate into the solvent bank to form a desired solution.

As previously mentioned, multiple contact miscibility is a function of the pressure of the system and this, in turn, is a function of reservoir temperature. At higher reservoir temperatures, higher pressures are needed to ensure miscibility. The miscibility of the solvent and the reservoir oil is, however, improved by the presence of additives which are soluble in both the solvent and the oil and whose presence reduces the minimum miscibility pressure of the solvent/oil system. Typical additives of this kind used with carbon dioxide as the solvent are low molecular weight hydrocarbons such as LPG and $C_2$ to $C_{10}$ aliphatic hydrocarbons, preferably $C_2$ to $C_6$ aliphatic hydrocarbons such as ethane, propane, butane, pentane, and hexane and their mixtures. Another suitable additive of this kind is tall oil, which is a byproduct of paper making and which typically consists of long chain fatty acids, rosins and other ingredients including long chain cyclic alcohols. Tall oil is highly soluble in most crude oils and improves the miscibility of the crude oil with carbon dioxide; tall oil and its preparation and use in oil recovery are described in U.S. Pat. No. 3,497,007, to which reference is made for further details.

When carbon dioxide is used as the solvent, it should be injected under sufficient pressure so that under the conditions which prevail in the reservoir, it is present as a dense phase, that is, it is under supercritical conditions and present neither as a liquid or a dense vapor. Generally, this will be achieved by maintaining pressure in the reservoir sufficiently high to maintain the carbon dioxide in the required dense phase state, i.e. at a density greater than approximately 0.4 g cm.$^{-3}$. This pressure, in itself, increases with increasing reservoir temperature and the pressure should therefore be chosen in accordance with reservoir temperature. Typical minimum pressures for maintaining the dense phase state are 900 psia at 85° F., 1200 psia at 100° F., 1800 psia at 150° F., 2500 psia at 200° F. and 3100 psia at 250° F. (6205 kPa at 30° C., 8275 kPa at 38° C., 12,410 kPa at 65° C., 17,235 kPa at 93° C. and 21,375 kPa at 120° C.). However, the pressure actually necessitated in the reservoir will also depend upon the MMP of the crude oil, using the solubility additive which has been selected. This may be found by simple experiment, using samples of the reservoir crude, the selected additve and the selected solvent. The amount of solvent used will generally be in the range of 0.3–0.6 hydrocarbon pore volume (HCPV) with an optimal range of about 0.35 to 0.45 although this will depend upon reservoir and crude characteristics as well as other factors. For any reservoir, the optimum quantity of solvent may be found by suitable experiment or simulation prior to the start of actual recovery operations.

The solvent is initially injected into the formation with a predetermined amount of the solubility additive at pressures greater than the MMP but near the current reservoir pressure if this is below the MMP (if the reservoir pressure is above the MMP, the carbon dioxide will form the single phase solution without the necessity of the solubility additive although it may be desirable to use the additive for other reasons). The solubility additive is present in the initial portion of the solvent in an amount which is sufficient to lower the MMP to a value which is no higher than the reservoir pressure so that multiple contact miscibility is attained as the bank of solvent begins to permeate the reservoir. Because, as explained below, the solubility additive tends to remain with the crude oil in the formation as the solvent front advances, it may be desirable to include additional amounts of the solubility additive in the initial portion of the solvent in excess of the amount necessary to reduce the MMP to the desired value. The amounts of the preferred light hydrocarbon solubility additives used with carbon dioxide as the solvent are typically from 2 to 25 mole percent, preferably 5 to 10 mole percent, in the initial portion of the solvent, decreasing to zero in the final portion of the solvent.

The solubility improving additive is soluble in the reservoir oil as well as the solvent and therefore remains in the oil which is not displaced by the solvent as it moves through the reservoir. For this reason, it is possible to reduce the amount of the solubility additive which is injected with the solvent as the flooding operation proceeds. If the injected solvent, at any point in the reservoir, contains a proportion of the solubility additive which is below the equilibrium amount and residual oil contains an excess of the additive, the additive will either vaporize or be extracted from the residual oil, thus restoring an equilibrium condition to the solvent/additive/crude oil system at that point. This, in turn, reduces the MMP for the reservoir oil from the value which would obtain if the solubility additive were not present. Thus, as the amount of the additive in the solvent is reduced and the solvent bank advances through the reservoir, a continuous equilibrium is set up by which the solubility additive is progressively extracted from the residual oil by the advancing solvent and used to lower the MMP, giving a continuous improvement in the solubilizing and displacing effect of the solvent, without the necessity for continuously adding the solubility additive. In this way, the amount of solubility additive which is required is reduced and, because it is continuously extracted from the reservoir as more solvent is injected, its recovery is improved, making the process more economically attractive from two points of view. Furthermore, the residual oil saturation will be lowered because of the improved efficiency of the miscible flooding operation, as compared to an operation which did not employ the solubility additive. The final amounts of solvent which are injected may be pure solvent, both because a relatively smaller amount of the solubility additive is required when most of the residual oil has been displaced and because it is desirable to extract as much as possible of the additive from the residual oil remaining in the formation. The reduction in the amount of the solubility additive may be carried out continuously or step-wise although, for practical reasons, step-wise reduction will normally be employed.

As well as bringing about an improvement in the recovery by a reduction in the residual oil saturation, the use of the solubility additive also tends to improve the macroscopic sweep efficiency of the operation by reducing the gravity override of the solvent. Gravity override is the term used to describe the tendency of a solvent to rise towards the top of a reservoir over the denser crude oil and water which are in place in the reservoir. By decreasing the size of the miscible zone and the amount of oil contacted by the solvent, it tends to reduce the oil recovery. One method of suppressing the override tendency is to inject at the maximum rate allowed by field constraints so that the resulting higher flow velocities in the horizontal direction balance the upward gravitational forces. (Reducing the well spacing also helps to suppress override but the economics become less favorable because of the reduced recovery at each production well). The use of the soluble additive, especially butane, is particularly advantageous in this respect, that it increases the swelling of the oil by the solvent and facilitates the production of a lower viscosity miscible phase to be achieved at lower pressures which permit higher injection rates to be employed.

A further improvement in the efficiency of the process may be achieved by injecting the mixture of solvent and additive, if present, in slugs with slugs of water being injected between the solvent slugs in order to improve the sweep of the solvent. In this respect, the process will be a WAG (water alternating gas) process in which slugs of water injected alternatively with slugs of carbon dioxide into the formation will improve the gas invasion and solubilizing effect of the carbon dioxide. The solvent slugs will generally be equal in volume, alternating with water slugs of an equal volume, followed by a final water drive. Each solvent slug should be large enough to ensure miscible conditions and given the economic constraints on total solvent usage, this will generally imply that not more than about four solvent slugs will be employed. At an optimal total solvent usage of 0.4 HCPV this will require four slugs of 0.1 HCPV each, separated by water slugs of 0.1 HCPV. However, the water:solvent (WAG) ratio may vary up to 4:1 although the higher WAG ratios above 2:1 may tend to dissipate the miscible zone ahead of the water front and reduce the recovery. In a multiple solvent slug operation, the proportion of the solubility additive may be incrementally reduced with each solvent slug or may be held at a constant value in the initial slugs and reduced to zero in the final slug, e.g. in a four-slug operation, it may be used in proportions of 10%, 10%, 10% and 0%, with a solvent slug size of 0.1 HCPV (total solvent 0.4 HCPV), and a water slug size of 0.1 HCPV (water slug total 0.3 HCPV with water drive following final solvent slug).

The invention is illustrated by the following Examples in which all percentages are by mole unless the contrary is stated.

EXAMPLE 1

A reservoir with a current reservoir pressure of 2100 psi and a residual oil saturation to water flood of 20% has a minimum miscibility pressure (MMP) of 2700 psi with pure carbon dioxide as a solvent. Laboratory data indicate that 10% n-butane added to the carbon dioxide decreases the MMP with the reservoir oil to 2100 psi. A multi-contact miscible water alternating gas (WAG) process was modeled using a miscible flood numerical simulator by the following process steps:

(1) Solvent/additive slug consisting of 90% carbon dioxide and 10% n-butane was injected into the reservoir and was followed by a water slug in a 1:1 volumetric ratio, equivalent to 0.10 hydrocarbon pore volume (HCPV);

(2) Step (i) was repeated for a total of three successive slugs;

(3) A fourth solvent slug equivalent to 0.10 HCPV consisting of 100% carbon dioxide was injected;

(4) The fourth solvent slug was followed by continuous water injection until the water cut at the producing well became uneconomical.

The simulation was made of a two dimensional, vertical cross-section of a reservoir model 50 feet (15.2 m) thick in a 20 acre (8.1 ha) five spot pattern, equivalent to a distance of 660 feet (201 m) between the injection well and the production well. The production well was open during the entire process, continuously producing reservoir fluids. Recovery included reservoir oil and solution gas as well as a proportion of the injected solvent and additive. The injection and production for each phase of the process are summarized in Table 1 below.

TABLE 1

| | | Injection and Recovery | | | | | |
| | | Cumulative Injection | | | Cumulative Production | | |
| Day | Slug | $CO_2$ (mmcf) | Butane (mmcf) | Soln. Gas (mmcf) | $CO_2$ (mmcf) | Butane (mmcf) | Oil (mstb) |
| 128 | 1 | 64.03 | 7.115 | 0 | 0 | 0 | 0 |

TABLE 1-continued

Injection and Recovery

| | | Cumulative Injection | | | Cumulative Production | | |
|---|---|---|---|---|---|---|---|
| Day | Slug | CO2 (mmcf) | Butane (mmcf) | Soln. Gas (mmcf) | CO2 (mmcf) | Butane (mmcf) | Oil (mstb) |
| 266 | 2 | 128.1 | 14.23 | 0 | 0 | 0 | 0 |
| 605 | 3 | 192.1 | 21.35 | 10.89 | 9.573 | 0 | 12.25 |
| 839 | 4 | 263.3 | 21.35 | 13.89 | 66.69 | 4.882 | 24.76 |
| 2350 | — | 263.3 | 21.35 | 17.56 | 211.3 | 14.26 | 35.16 |

Table 2 below shows the butane concentration in the vapor phase throughout the reservoir model during the injection of the fourth solvent slug which consisted of 100% carbon dioxide. Significant portions show butane vapor phase concentrations above the first three injection concentration fractions of 0.10. Areas near the injection wellbore show almost no butane as would be expected since a pure carbon dioxide slug is being injected. The distribution of butane in the vapor phase demonstrates the stripping effect of the last solvent slug.

The results reported in the tables below refer to the simulation grid used for the reservoir model, the simulated reservoir being equivalent to a quarter of a 20 acre (8.1 ha) five spot pattern, 50 feet (15.2 m) thick. The simulated section was divided into a 19 (horiz.)×4 (vert.) uniform grid (660 ft. horiz.×50 ft. vert-201 m. horiz.×15.2 m vert.) with the injection and production wells completed over the entire 50 ft. (15.2 m) interval. In the tables below, the I positions refer to the horizontal grid axis with the injection well at the left of grid position I=1 and the production well to the right of grid position I=19; the K positions refer to the vertical grid axis with K=1 being the bottom position and K=4 the top.

TABLE 2

Butane Concentration in Vapor Phase (Mol. Frac.)

| I = | 1 | 2 | 3 | 4 | 5 | 6 | 7 | 8 | 9 | 10 |
|---|---|---|---|---|---|---|---|---|---|---|
| K = 4 | .00048 | .03666 | .10224 | .10073 | .10342 | .10753 | .10974 | .10932 | .10640 | .10033 |
| K = 3 | .00008 | .03540 | .10323 | .10243 | .10682 | .10539 | .09600 | .07928 | .05439 | .03887 |
| K = 2 | .00004 | .03477 | .10332 | .10504 | .10002 | .07785 | .04735 | .02353 | .00534 | .00022 |
| K = 1 | .00003 | .03998 | .10482 | .10708 | .09186 | .04298 | .00296 | 0.00000 | 0.00000 | 0.00000 |

| I = | 11 | 12 | 13 | 14 | 15 | 16 | 17 | 18 | 19 |
|---|---|---|---|---|---|---|---|---|---|
| K = 4 | .09010 | .08644 | .08732 | .08790 | .08704 | .08364 | .07872 | .07390 | .06920 |
| K = 3 | .02998 | .02551 | 0.00000 | 0.00000 | 0.00000 | 0.00000 | .04249 | .05224 | .06134 |
| K = 2 | 0.00000 | 0.00000 | 0.00000 | 0.00000 | 0.00000 | 0.00000 | 0.00000 | 0.00000 | .04469 |
| K = 1 | 0.00000 | 0.00000 | 0.00000 | 0.00000 | 0.00000 | 0.00000 | 0.00000 | 0.00000 | 0.00000 |

Note:
I, K refer to grid positions.

Table 3 below shows the hydrocarbon phase saturation during the solvent slug at each postion in the reservoir. The saturation in the miscibly swept region has been reduced below the residual oil saturation to miscible flow of 0.05. During the early slugs, butane was stored in these regions in the hydrocarbon phase, replacing the nonvolatile reservoir oil while maintaining the residual oil saturation of 0.05. The final slug of pure carbon dioxide strips the volatile butane from the hydrocrbon phase, thus reducing the residual oil saturation.

TABLE 3

Hydrocarbon Phase Saturation

| I = | 1 | 2 | 3 | 4 | 5 | 6 | 7 | 8 | 9 | 10 |
|---|---|---|---|---|---|---|---|---|---|---|
| K = 4 | .00687 | .00554 | .02595 | .03229 | .03825 | .04578 | .05156 | .05357 | .05731 | .07133 |
| K = 3 | .00610 | .00551 | .02763 | .03657 | .04990 | .05177 | .06472 | .15936 | .24197 | .27097 |
| K = 2 | .00605 | .00558 | .02841 | .04193 | .06350 | .14977 | .24749 | .27804 | .28360 | .30535 |
| K = 1 | .00607 | .00591 | .03128 | .04720 | .09543 | .24858 | .24212 | .28478 | .29727 | .25125 |

| I = | 11 | 12 | 13 | 14 | 15 | 16 | 17 | 18 | 19 |
|---|---|---|---|---|---|---|---|---|---|
| K = 4 | .12698 | .13844 | .13612 | .14706 | .17315 | .21436 | .21861 | .22697 | .23608 |
| K = 3 | .28835 | .37795 | .39197 | .39463 | .39711 | .40621 | .41218 | .33324 | .27197 |
| K = 2 | .30571 | .30279 | .29983 | .30064 | .30118 | .30271 | .31861 | .35133 | .30897 |
| K = 1 | .19539 | .19601 | .19797 | .19792 | .19786 | .19779 | .19769 | .19796 | .19741 |

Note:
I, K refer to grid positions.

EXAMPLES 2-5

A number of simulation runs were made on the reservoir model, using four solvent ($CO_2$ and N-$C_4$) slugs with intervening water slugs of equivalent size, followed by final water drive. For comparison, a $CO_2$-only run was conducted (Ex. 5).

TABLE 4

$CO_2$/n-Butane WAG Process

| Example No. | 2 | 3 | 4 | 5 |
|---|---|---|---|---|
| Run Descr. | $CO_2$/n-$C_4$ in 4 slugs | $CO_2$/n-$C_4$ in 3 slugs | $CO_2$/n-$C_4$ in 2 slugs | $CO_2$ only |
| Total n-$C_4$. (mole % of solvent) | 10 | 7.5 | 5 | 0 |
| Slug n-$C_4$ concentration (mole %) | | | | |
| 1 | 10 | 10 | 10 | 0 |
| 2 | 10 | 10 | 10 | 0 |
| 3 | 10 | 10 | 0 | 0 |
| 4 | 10 | 0 | 0 | 0 |
| Injection Average rate | | | | |
| MCF/day | 557.2 | 560.6 | 592.5 | 668.4 |
| RCF/day | 2623 | 2639 | 2789 | 2160 |
| Cumulative, MMCF | 284.5 | 284.6 | 284.6 | 284.5 |
| $CO_2$ | 256.2 | 263.3 | 270.4 | 284.5 |
| n-$C_4$ | 28.3 | 21.3 | 14.2 | 0 |
| WAG ratio | 1:1 | 1:1 | 1:1 | 1:1 |
| HCPV solvent | 0.4 | 0.4 | 0.4 | 0.4 |
| Production (at end of project)* | | | | |
| Stock tank oil | 30.69 | 32.76 | 29.18 | 22.48 |

TABLE 4-continued blocks has been swept far below that of the $CO_2$-only base case (Ex. 5).

TABLE 5

Residual Non-Volatile Oil Saturation

| I = | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| | | | | | | | | | Example 2 | | | | | | | | | | |
| K = 4 | .0018 | .0011 | .0027 | .0037 | .0041 | .0044 | .0045 | .0048 | .0049 | .0069 | .0127 | .0316 | .0523 | .0561 | .0588 | .0607 | .0641 | .0723 | .0716 |
| K = 3 | .0018 | .0011 | .0028 | .0040 | .0045 | .0052 | .0069 | .0177 | .0506 | .0805 | .0965 | .1086 | .1122 | .1140 | .1234 | .1286 | .1289 | .1294 | .1277 |
| K = 2 | .0018 | .0011 | .0028 | .0040 | .0054 | .0126 | .0626 | .0921 | .1066 | .1134 | .1136 | .1206 | .1226 | .1300 | .1339 | .1382 | .1460 | .1496 | .1490 |
| K = 1 | .0018 | .0011 | .0030 | .0042 | .0072 | .0639 | .1034 | .1121 | .1167 | .1171 | .1235 | .1272 | .1302 | .1362 | .1247 | .1115 | .1117 | .1118 | .1185 |
| | | | | | | | | | Example 5 | | | | | | | | | | |
| K = 4 | .0254 | .0249 | .0248 | .0247 | .0247 | .0247 | .0190 | .0192 | .0194 | .0214 | .0284 | .0379 | .0474 | .0564 | .0640 | .0717 | .0773 | .0801 | .1013 |
| K = 3 | .0255 | .0251 | .0249 | .0249 | .0249 | .0250 | .0195 | .0231 | .0405 | .0814 | .1131 | .1287 | .1330 | .1379 | .1453 | .1523 | .1562 | .1585 | .1662 |
| K = 2 | .0256 | .0251 | .0250 | .0250 | .0252 | .0269 | .0387 | .0790 | .1136 | .1267 | .1339 | .1410 | .1458 | .1189 | .1080 | .1084 | .1106 | .1520 | .2195 |
| K = 1 | .0256 | .0252 | .0252 | .0253 | .0259 | .0458 | .1128 | .1163 | .1259 | .1342 | .1089 | .1064 | .1069 | .1074 | .1079 | .1083 | .1087 | .1090 | .1095 |

Note:
1. K refer to grid positions.

| | CO$_2$/n-Butane WAG Process | | | |
|---|---|---|---|---|
| Example No. | 2 | 3 | 4 | 5 |
| MBBLS | | | | |
| Oil in place | 32.9 | 35.08 | 31.25 | 23.64 |
| Gas, MMCF | | | | |
| Solution | 15.68 | 16.48 | 15.13 | 13.97 |
| CO$_2$ | 121.3 | 160.7 | 168.5 | 96.45 |
| n-C$_4$ | 10.89 | 13.59 | 8.35 | 0 |
| Water, MBBLS | 293.9 | 308.4 | 269.5 | 401.6 |
| Solvent Recovery | | | | |
| % Recovered | | | | |
| CO$_2$ | 47.35 | 61.03 | 62.41 | 33.9 |
| n-C$_4$ | 38.48 | 63.65 | 59.64 | — |
| Efficiency** | | | | |
| (MCF inj/bbl oil) | | | | |
| CO$_2$ | 8.348 | 8.046 | 9.267 | 12.7 |
| n-C$_4$ | .629 | .650 | .487 | — |
| total | 8.977 | 8.696 | 9.754 | 12.7 |

*End of project occurs when water-oil ratio reached 0.99.
**All in barrels of incremental oil recovery over waterflood, which had zero recovery.

Comparison of Examples 2 and 5 shows that the addition of n-butane resulted in a significant increase in oil recovery from about 24% to about 33% of the oil in place (initial oil saturation of 20%). Oil recovery increased further, however, when the butane was omitted from the final solvent slug (Ex. 3) and that only a slight decline was noted when the butane was omitted from the third and fourth slugs (Ex. 4). In these cases, butane from the earlier slugs had been dissolved and stored in the residual oil behind the miscible front. This stored butane vaporized into the gas phase upon contact with subsequent pure CO$_2$ slugs, resulting in an in-situ enrichment of the CO$_2$ stream, allowing at least partial miscibility to be obtained. In addition, stripping of the n-butane from the oil further reduced the residual oil saturation and increased butane recovery. This indicates the potential for obtaining improved recovery with a smaller amount of solubility additive than if a constant amount of the additive is added to the solvent. Furthermore, this is not the same as adding a reduced amount of the additive, e.g. 5% as against 10%, in all the solvent slugs because a lower concentration in all the slugs would necessitate a higher pressure in order to achieve miscibility, i.e. a higher MMP and even if this can be attained in a given reservoir, it will usually imply lower injection rates with the resultant increase in gravity override and its concomitant decrease in production.

Table 5 below gives the residual non-volatile oil saturations for Examples 2 and 5, showing that the residual saturation for the CO$_2$/butane run (Ex. 2) in many

We claim:

1. A method for the recovery of oil from a subterranean, oil-bearing reservoir penetrated by an injection well and a production well extending from the surface of the earth into the reservoir, which method comprises:
   (i) injecting into the reservoir through the injection well, a mixture of a multiple contact miscible solvent for the oil and a solubility improving additive in an amount sufficient to lower the minimum miscibility pressure to a value no higher than the reservoir pressure thereby attaining multiple contact miscibility as said solvent begins to penetrate said reservoir;
   (ii) producing fluids including oil from the production well; and
   (iii) continuing to inject the mixture of solvent and solubility additive into the reservoir with a reduced proportion of the additive in the mixture relative to the initially injected mixture.

2. The method according to claim 1 in which the amount of additive in the mixture is reduced to zero in the finally injected portion of the mixture.

3. The method according to claim 1 in which the concentration of the solubility additive in the mixture is reduced step-wise as the mixture is injected.

4. The method according to claim 1 in which the mixture is injected in slugs into the reservoir.

5. The method according to claim 4 in which slugs of water are injected into the reservoir through the injection well between the slugs of the mixture.

6. The method according to claim 5 in which the concentration of the solubility additive in the final slug of the mixture is zero.

7. The method according to claim 1 in which the solvent is carbon dioxide.

8. The method according to claim 7 in which the solubility additive comprises a low molecular weight hydrocarbon.

9. The method according to claim 8 in which the solubility additive comprises a C$_2$ to C$_6$ paraffin.

10. The method according to claim 1 in which water is injected into the reservoir through the injection well following the final injection of the mixture.

11. A method for the recovery of oil from a subterranean, oil-bearing reservoir penetrated by an injection well and a production well extending from the surface of the earth into the reservoir, which method comprises:

(i) injecting into the reservoir through the injection well a slug of a mixture of a multiple contact miscible solvent for the oil and a solubility improving additive in an amount sufficient to reduce the minimum miscibility pressure of the oil/solvent system to a value which is no higher than the prevailing reservoir pressure thereby attaining multiple contact miscibility as said solvent begins to penetrate said reservoir;

(ii) injecting a slug of water after the slug of the solvent/solubility additive mixture;

(iii) injecting a slug of the solvent into the reservoir through the injection well; and (iv) producing fluids including oil from the production well.

12. The method according to claim 11 in which a plurality of slugs of the solvent/solubility additive mixture are injected into the reservoir through the injection well in step (i).

13. The method according to claim 12 in which a slug of water is injected into the formation between each two slugs containing the solvent of step (i).

14. The method according to claim 13 in which water is injected into the reservoir after the final slug containing the solvent.

15. The method according to claim 11 in which the final solvent containing slug comprises pure solvent.

16. The method according to claim 11 in which the solvent comprises carbon dioxide.

17. The method according to claim 16 in which the solubility additive comprises a low molecular weight hydrocarbon.

18. The method according to claim 17 in which the solubility additive comprises a $C_2$ to $C_6$ paraffin.

19. The method according to claim 18 in which the paraffin is n-butane.

20. The method according to claim 11 in which pure solvent is injected into the reservoir through the injection well when the residual oil becomes saturated with the solubility improving additive.

21. A method for improving the sweep efficiency of a subterranean oil recovery operation by reducing the gravity override of a solvent comprising:

(i) injecting into a reservoir through an injection well a slug of a mixture of a multiple contact miscible solvent for the oil and a solubility improving additive at a flow velocity in the horizontal direction sufficient to balance upward gravitational forces and in an amount sufficient to reduce the minimum miscibility pressure of the oil/solvent system to a value which is no higher than the prevailing reservoir pressure thereby attaining multiple contact miscibility as said solvent begins to penetrate said reservoir;

(ii) producing fluids including oil from the production well; and (iii) continuing to inject the mixture of solvent and solubility additive into the reservoir with a reduced proportion of the additive in the mixture relative to the initially injected mixture sufficient to maintain continuous equilibrium in said reservoir which improves the solubilizing and displacing effect of said solvent.

22. The method according to claim 21 in which the amount of additive in the mixture is reduced to zero in the finally injected portion of the mixture.

23. The method according to claim 21 in which the concentration of the solubility additive in the mixture is reduced step-wise as the mixture is injected.

24. The method according to claim 21 in which the mixture is injected in slugs into the reservoir.

25. The method according to claim 24 in which slugs of water are injected into the reservoir through the injection well between the slugs of the mixture.

26. The method according to claim 25 in which the concentration of the solubility additive in the final slug of the mixture is zero.

27. The method according to claim 21 in which the solvent is carbon dioxide.

28. The method according to claim 27 in which the solubility additive comprises a low molecular weight hydrocarbon.

29. The method according to claim 28 in which the solubility additive comprises a $C_2$ to $C_6$ paraffin.

30. The method according to claim 21 in which water is injected into the reservoir through the injection well following the final injection of the mixture.

* * * * *